United States Patent [19]

Mitchell et al.

[11] Patent Number: 4,666,084

[45] Date of Patent: May 19, 1987

[54] NOZZLE ASSEMBLY

[75] Inventors: Ronald B. Mitchell, Brigham City; Frederick W. Du Vall, Ogden, both of Utah

[73] Assignee: The United States of America as represented by the Secretary of the Navy, Washington, D.C.

[21] Appl. No.: 874,310

[22] Filed: Jun. 9, 1986

[51] Int. Cl.[4] .................. B63H 11/10; F02K 1/00
[52] U.S. Cl. .................. 239/265.43; 239/269.19; 239/265.33; 60/271
[58] Field of Search .............. 239/265.11, 265.19, 239/265.33, 265.43; 60/230, 242, 271

[56] References Cited

U.S. PATENT DOCUMENTS

| | | | |
|---|---|---|---|
| 3,156,091 | 11/1964 | Kraus | 239/265.11 |
| 3,243,124 | 3/1966 | Lee | 239/265.11 X |
| 3,265,314 | 8/1966 | Helms et al. | 239/265.11 X |
| 3,504,902 | 4/1970 | Irwin | 60/271 X |
| 3,504,903 | 4/1970 | Irwin | 60/271 X |
| 3,723,214 | 3/1973 | Meraz | 239/265.11 X |
| 3,830,431 | 8/1974 | Schwartz | 239/265.11 |
| 3,896,615 | 7/1975 | Slatkin et al. | 60/204 |
| 3,908,175 | 9/1975 | Damm | 331/94.5 G |
| 3,910,191 | 10/1975 | Williams | 102/49.3 |
| 3,930,627 | 1/1976 | Miller | 244/121 |
| 4,091,709 | 5/1978 | Spurk | 89/1.703 |

Primary Examiner—Andres Kashnikow
Assistant Examiner—Patrick N. Burkhart
Attorney, Agent, or Firm—R. F. Beers; C. D. B. Curry; S. G. Precivale

[57] ABSTRACT

A nozzle assembly capable of controlling the hot exhaust gases which flow from the burning solid rocket propellant.

6 Claims, 1 Drawing Figure

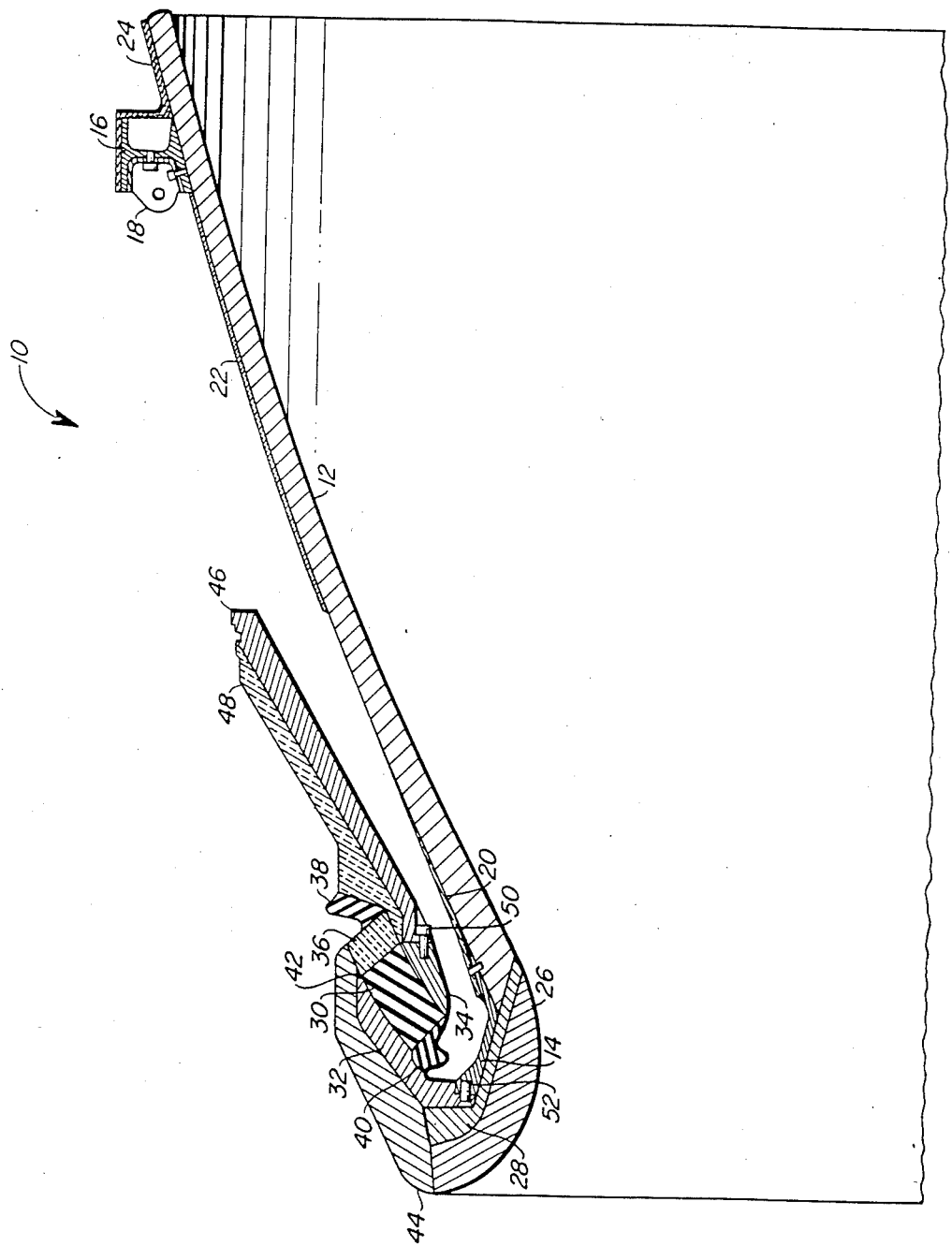

NOZZLE ASSEMBLY

BACKGROUND OF THE INVENTION

1. Field of the Invention

This invention relates to nozzle assemblies for rocket missiles. More particularly, but without limitation thereto, this invention relates to nozzles whose primary function is to provide control of the hot exhaust gases which flow from the burning solid propellant of the rocket motor.

2. Description of the Prior Art

Several designs have been utilized as a means for steering missiles. However, despite the development of the art, there remains a continuing need for improved techniques of providing thrust vector control for missiles.

An example of one such measure is the movement or deformation of the rocket nozzle in such a way so as to alter the direction of the exhaust gases flowing through the nozzle.

SUMMARY OF THE INVENTION

An object of the present invention is to develop a means for providing thrust vector control for missiles. A further object of the invention is to provide control of the hot exhaust gases flowing from the burning solid propellant of the rocket motor.

These and other objects have been demonstrated by the present invention wherein the nozzle utilizes a flexible bearing to aid in movement, and a nozzle throat and exit contour which are configured to as to deliver maximum thrust within the allowed envelope.

BRIEF DESCRIPTION OF THE DRAWING

The invention will be described in further detail with reference to the accompanying drawings wherein:

the single FIGURE is a cross-sectional view of the invention taken along the longitudinal axis.

DESCRIPTION OF THE PREFERRED EMBODIMENT

The preferred embodiment of the invention includes the rocket nozzle assembly 10 in the FIGURE. The nozzle assembly 10 consists of five main components: the exit cone assembly, the throat assembly, the flexible seal configuration, the insulated shell and the entrance cap.

The exit cone assembly consists of an exit cone liner 12 which is tape wrapped from carbon cloth phenolic, cured and machined to the desired configuration. The liner 12 is affixed to an exit cone adapter 14, which is preferably machined from a titanium die forging. The exit cone assembly further consists of a compliance ring 16 and brackets, one of which is shown in the FIGURE as bracket 18. Both the compliance ring 16 and the bracket 18 can be machined from stainless steel forgings. A second bracket, not shown, is operatively connected to compliance ring 16, positioned 90 degrees from bracket 18.

The exit cone liner 12 is overwrapped with graphite epoxy which forms the exit cone structure 20. This structure is insulated in two areas. The first area lies between the compliance ring 16 and the exit cone adapter 14. Insulation 22 partially covers this area, as is shown in the FIGURE. A second strip of insulation 24 covers the area covering the compliance ring 16 and the outer edge of the structure 20. The configuration of insulation is illustrated in the FIGURE. An exceptionally suitable insulation material is cork.

The throat assembly consists of an integral-throat entrance 26, preferably machined from three-dimensional carbon-carbon composite, and throat insulation 28. This insulation is preferably tape wrapped from carbon cloth phenolic, cured and machined to the desired final configuration.

Movement of the nozzle 10 is accomplished by means of a flexible seal configuration comprising the core 30, encompassed in part by a forward end ring 32 and an aft end ring 34. The core 30 is made of glass epoxy reinforcements with carbon phenolic thermal tips sandwiched between rubber. Some reinforcements, also having carbon phenolic thermal tips, extend beyond the rubber to form a thermal barrier 36 which lies between the core 30 and the ozone barrier 38. This thermal barrier serves to protect the core 30 from the motor environment. A second ozone barrier 40 is positioned on the external side of the core 30, opposite the ozone barrier 38. These ozone barriers can be made of a material such as chlorobutyl rubber. An insulator 42 is also located at the junction where the entrance cap 44 and the thermal barrier 36 meet. It is preferably made of rubber. The entrance cap 44 is preferably made of carbon cloth phenolic, tape wrapped, cured and machined to final configuration.

The insulated shell has a stationary shell 46 and adjacent shell insulation 48. The shell can be machined from a rolled ring aluminum forging. The shell insulation 48 is preferably tape wrapped carbon fiber filled ethylene propylenediene monomer rubber which is machined after curing. The stationary shell 46 is attached to the aft end ring 34 of the flexible seal configuration, by means of a plurality of bolts, circumferentially positioned. Illustrative of this is bolt 50, shown in the FIGURE.

The insulated shell and the flexible seal configuration are then bolted onto the exit cone assembly by means of a plurality of bolts, circumferentially positioned. More specifically, the forward end ring 32 of the flexible seal configuration is bolted to the exit cone adapter 14 of the exit cone assembly. Illustrative of this is bolt 52, shown in the FIGURE.

The throat assembly is bonded at the throat insulation 28 interface with the forward end ring 32, the exit cone adapter 14 and the exit cone liner 12. The entrance cap 44 is then attached to the interface with the integral throat entrance 26, the throat insulation 28, the forward end ring 32 and the thermal barrier 36.

The last step in the assembly of the nozzle is the final machining of the inlet contour of the nozzle, that being the integral throat entrance 26.

This invention has been described in detail with particular reference to certain preferred embodiments thereof, but it will be understood that variations and modifications can be effected within the spirit and scope of the invention.

What is claimed is:

1. A rocket nozzle assembly having:
    an insulated shell comprised of a stationary shell and shell insulation adjacent thereto;
    a flexible seal configuration comprised of a core and adjacent thermal barrier encompassed in part by a forward end ring, an aft end ring and an insulator tip, said core and thermal barrier having a first and a second external side having ozone barriers adjacent thereto;

a plurality of bolts circumferentially positioned, affixing said stationary shell and said aft end ring;

an exit cone assembly comprised of an exit cone liner having two ends, affixed to an exit cone adapter at one end and a compliance ring at the opposite end, said liner being overwrapped with an exit cone structure, and said structure and said compliance ring being covered in part with insulation;

a plurality of bolts circumferentially positioned, affixing said forward end ring and said adapter;

a throat assembly comprising an integral throat entrance and throat insulation adjacent thereto, said throat insulation bonded to said forward end ring, said adapter and said liner; and an entrance cap attached to said throat assembly and said forward end ring.

2. The insulated shell of claim 1 wherein said shell insulation is tape wrapped carbon fiber filled ethylene propylenediene monomer rubber.

3. The flexible seal of claim 1 wherein said core is comprised of glass epoxy reinforcements with carbon phenolic thermal tips sandwiched between rubber.

4. The flexible seal of claim 1 wherein said thermal barrier is comprised of glass epoxy reinforcements with carbon phenolic thermal tips.

5. The flexible seal of claim 1 wherein said ozone barriers are chlorobutyl rubber.

6. The exit cone assembly of claim 1 wherein said insulation is cork.

* * * * *